UNITED STATES PATENT OFFICE.

FRANK MARQUARD, OF NEWBURYPORT, MASSACHUSETTS.

IMPROVEMENT IN COMPOSITION BOOT AND SHOE HEELS, SOLES, &c.

Specification forming part of Letters Patent No. 115,075, dated May 23, 1871.

I, FRANK MARQUARD, of Newburyport, in the county of Essex and State of Massachusetts, have invented certain Improvements in Composition Boot and Shoe Heels, of which the following is a specification:

This invention relates to the manufacture of boot and shoe heels and soles, being an improvement on my patent of November, 23, 1869, No. 97,206; and consists of an improved composition, in which I combine the following ingredients in or about the proportions hereinafter expressed.

I take one hundred pounds of ground or pulverized leather, using refuse scraps or pieces if necessary. To this I add five pounds of vegetable fiber, such as flax, hemp, or other suitable material, and from twenty to twenty-five pounds of ground or pulverized cork. These ingredients I thoroughly mix, and reduce to a uniform pulp by grinding them with a sufficient quantity of water in a suitable machine for about ten hours. I then draw off the greater portion of the water, and add about ten pounds of silicate of soda or soluble glass, and from ten to fifteen gallons of bullocks' blood, or other albuminous substance. After thoroughly mixing the whole I remove it from the machine and allow some of the liquor to drain off. I then shape the heels in a cast-iron die, and in so doing, I insert whatever means I may desire to use for fastening the heels to the boots and shoes; also, any nails which I may wish to put in; after which the heels are put away to dry. When perfectly dry they are pressed into proper shape in iron or steel dies at a temperature of about 300° F.

I vary the quantity of cork according to the shape and kind of heel required, and, if necessary, the pulverized leather may be omitted from the compound, its place being filled with cork.

By adding suitable pigments I can give the compound any desired color. The hardness of the heels may be increased by the addition of litharge to the composition, thereby rendering them water-proof, but somewhat brittle.

For soles I use more or less cork, and run the material into sheets, from which the soles may be stamped with cutters or shaped in dies.

Having thus fully described my invention, what I claim as new, and desire to secure by Letters Patent, is—

1. The compound for boot and shoe heels and soles, substantially as described.
2. The combination of pulverized cork with pulverized leather in the manufacture of composition soles and heels, substantially as described.

In testimony whereof I have signed my name to this specification in the presence of two subscribing witnesses.

FRANK MARQUARD.

Witnesses:
CARROLL D. WRIGHT,
C. F. BROWN.